M. HEALD.
FLOUR SIEVE.
APPLICATION FILED AUG. 24, 1920.

1,427,810.

Patented Sept. 5, 1922.

Inventor
Marion Heald,
By G. Hume Talbert
Attorney

Patented Sept. 5, 1922.

1,427,810

UNITED STATES PATENT OFFICE.

MARION HEALD, OF GOLDEN, COLORADO.

FLOUR SIEVE.

Application filed August 24, 1920. Serial No. 405,592.

*To all whom it may concern:*

Be it known that I, MARION HEALD, a citizen of the United States of America, residing at Golden, in the county of Jefferson and State of Colorado, have invented new and useful Improvements in Flour Sieves, of which the following is a specification.

The object of the invention is to provide a flour sieve which will prevent the spilling of flour while carrying the same to and from the flour receptacle or pantry, or other place where the flour may be kept. To this end, the invention comprises a cylinder having a movable bottom and means normally keeping the bottom closed but permitting it readily to be opened to deposit the contents of the cylinder.

The invention is shown in a specific embodiment to which, however, it is not to be restricted. The right is reserved to make such changes or alterations as the actual reduction to practice may suggest, in so far as such changes or alterations are compatible in spirit with the annexed claim.

Figure 1:
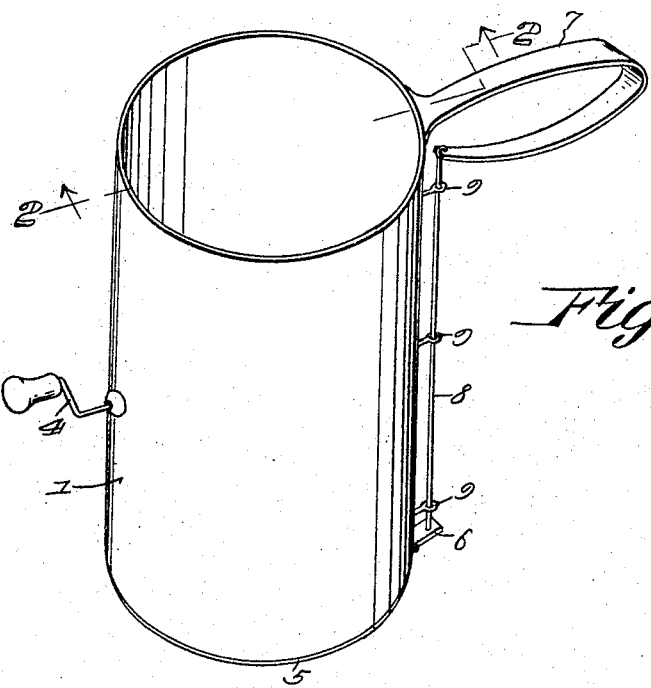
Figure 1 is a perspective view of the improved sieve.
Figure 2:
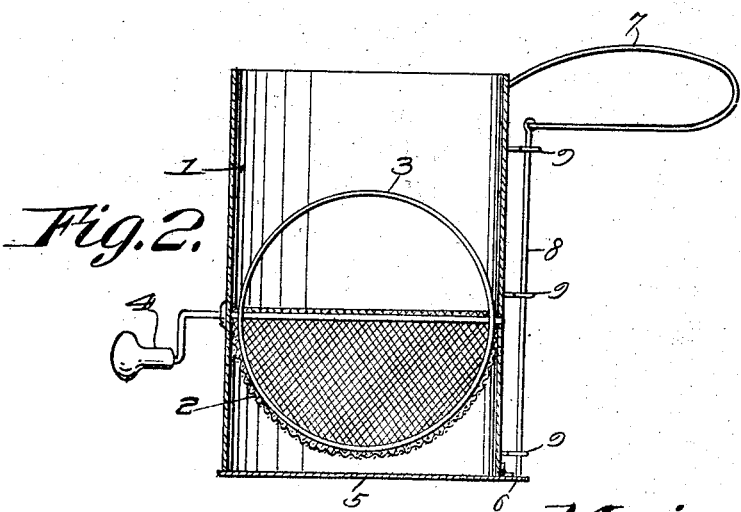
Figure 2 is a section on the line 2—2 of Figure 1.

Referring to the drawings, the invention is shown as comprising a cylinder 1 having an open top and carrying within the sifter 2 and the agitator 3 operable by the handle 4 in the usual well known manner.

The cylinder is formed with a hingedly attached bottom 5 carrying a projecting ear 6. The hinge of the bottom 5 will permit the latter to swing downwardly and thus deposit the contents of the cylinder but this bottom is kept normally in closed position and to that end there is provided a handle element 7 for the cylinder in the form of a spring member bent back on itself, and having one leg attached to the cylinder and the other leg pivotally connecting with a vertically disposed rod 8, the latter passing slidably through eyes 9 mounted on the outer wall of the cylinder and having its free end bearing upon the top face of ear 6. The spring element comprising the handle 7 is so constructed that its legs tend normally to move away from each other, and, therefore, the rod 8 is forced downwardly against the ear 6 with the result that the bottom 5 is raised and retained in closed position against the cylinder 1.

When flour is deposited in the cylinder through the open top, it may be carried from one place to the other without fear of spilling inasmuch as the bottom 5 is retained in closed position. After the sifting operation has been performed or while it is being performed, the two legs of the handle element may be pressed towards each other, thus releasing pressure of the rod 8 on the ear 6, whereupon the bottom 5 is permitted to drop and deposit the contents of the cylinder into a bowl or other receptacle where it is desired to place it.

I claim—

A utensil of the kind set forth comprising a cylinder, a bottom element hingedly attached to the cylinder at its lower end and formed with a projecting ear, a U-shaped spring handle element for the cylinder having one leg attached to the cylinder, and a rod member slidably mounted on the cylinder, and having one end pivotally connected to the remaining leg of the handle element and the remaining end bearing upon said ear for the useful purposes herein specified.

In testimony whereof I affix my signature.

MARION HEALD.